UNITED STATES PATENT OFFICE.

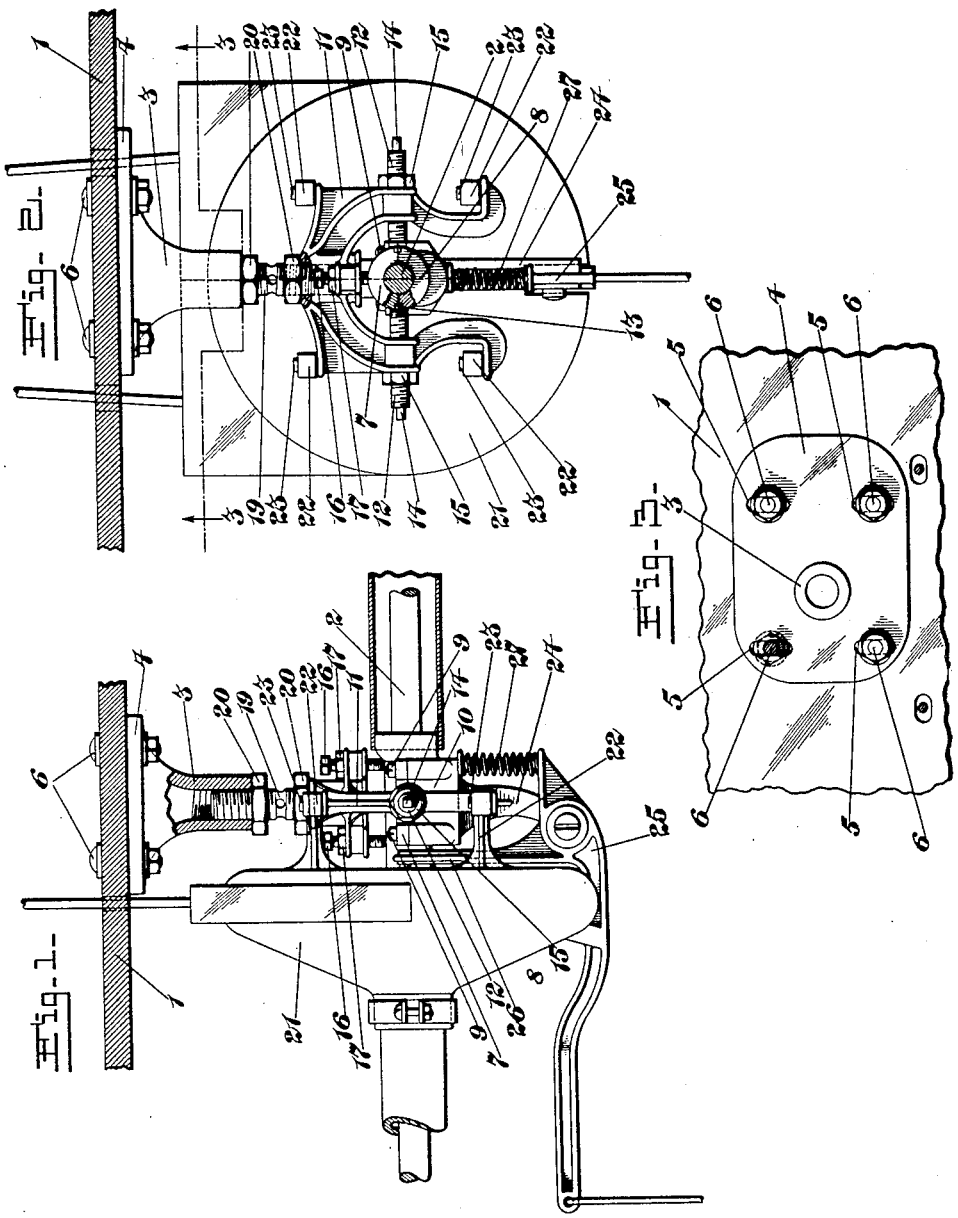

BENJAMIN WEINBERGER, OF ST. LOUIS, MISSOURI, ASSIGNOR TO MARX & HAAS CLOTHING CO., OF ST. LOUIS, MISSOURI, A CORPORATION.

SHAFT-HANGER.

1,387,571.  Specification of Letters Patent.  Patented Aug. 16, 1921.

Application filed June 14, 1920. Serial No. 388,730.

*To all whom it may concern:*

Be it known that I, BENJAMIN WEINBERGER, a citizen of the United States, residing at the city of St. Louis and State of Missouri, have invented a new and useful Shaft-Hanger, of which the following is a specification.

This invention relates to shaft hangers, and has special reference to devices for supporting power driven shafts, although it may be used for various purposes.

An object of the invention is to provide means for supporting a shaft or other device in any desired angle of inclination and capable of adjustment to vary the adjusted position of the shaft or other device supported by the hanger.

Heretofore in factories in which power driven sewing machines or other machines are driven from a common shaft equipped with power transmission mechanism difficulty has been encountered in supporting the shaft properly. Such shafts are often equipped with transmission mechanism in the form of clutch members which may be controlled to operate the sewing machine or other machine or not, as desired, while the shafts remain in constant rotation. Obviously it is desirable to support the shaft bearings in accurate alinement so that the shaft may be driven easily and freely without lateral strains of any kind to which the shaft would be subjected if the bearings are not in proper alinement.

It is a matter of common knowledge that difficulty has been encountered in mounting the shafts properly so that they will operate free from strains caused by improper alinement of the bearings. There has been a need and demand for means for supporting the shaft bearings so that they may be readily adjusted to and maintained in accurate alinement notwithstanding any inequality in the alinement of the tables, benches or other supports from which the shafts are supported.

My present invention satisfactorily meets this existing need and requirement. By use of the invention the shaft bearings may be accurately alined and held in such alinement irrespective of any slight inequalities or unevenness in the positions of the supporting tables or benches. The shaft bearings may be varied laterally or vertically, or the angle of inclination of the shaft bearings may be varied as required to place the bearings in proper alinement, irrespective of the positions of the tables or benches.

The provision of mechanism or devices for the solution of these difficulties in a satisfactory manner is a principal object of the invention.

With the foregoing and other objects in view, I have embodied my invention in a highly efficient form and have shown the same in the accompanying drawings, in which—

Figure 1 is a side elevation of my improved shaft hanger, a part of the supporting bracket being in section.

Fig. 2 is another elevation showing the supported shaft in section.

Fig. 3 is a view showing the construction of the supporting bracket viewed from the line 3—3 of Fig. 2.

As is well known, the sewing machines are screwed in operative positions upon the upper surfaces of a bench or table 1 and it has heretofore been common practice to drive the machines from a power driven shaft 2 supported below the bench or table and driven by some form of motor or power mechanism. My invention comprises an improved supporting device for the shaft from which the sewing machines are driven, and a novel form of mechanism for driving the machines from the shaft.

Each journal bearing for the power driven shaft, and each independently operable transmission mechanism, are supported from a hanger bracket secured in connection with the lower side of the bench or table. As shown, each hanger bracket comprises a threaded sleeve portion 3 flaring outwardly toward its upper end to form a flat portion 4 arranged to bear against the lower surface of the bench or table. The flat portion 4 is formed with a number of transverse slots 5 for receiving the bolts 6, by which the hanger bracket is held in connection with the bench or table. The slots 5 permit any necessary lateral adjustment of the hanger bracket, as may be required to avoid any fixed part of the bench or table or to effect proper adjustment or alinement of any journal bearing, relative to other journal bearings for the shaft 2, or other parts of the machines. The slots 5 also permit adjustment of the hanger bracket toward and away from the side edge of the bench or table so that the bearings may be accurately alined even when supported from different benches or tables, and without the necessity and trouble of precisely alining the benches or tables. This is an important feature of the invention since it permits the bearing and the support therefor to be bodily supported in different adjusted positions. Each of the sleeves 3 is interiorly threaded.

An independent journal bearing for the shaft 2 is provided in association or connection with the transmission driving mechanism of each sewing machine. In the embodiment shown, each journal bearing is in the form of a sleeve composed of an upper portion 7 and a lower portion 8 secured together by screws 9 passing through ears in connection with one of said members and effecting threaded engagement within threaded holes in the other member. The lower member 8 of the journal bearing is provided with an oil or grease cup or chamber 10 to maintain the shaft in the condition of proper lubrication.

The journal bearing thus constructed is supported between the legs of a bifurcated bracket 11. Threaded rods 12 are screwed through the alined holes in the legs of the bracket 11. There are only two of the rods 12, and one of said rods is supported by each leg of the bracket 11 so that said rods are in axial alinement. The inner ends of the rods 12 are formed with reduced portions 13, seating within recesses on opposite sides of the journal bearing above described so that the journal bearing is pivotally supported by the inner ends of the alined rods 12. This construction permits sidewise adjustment of the journal bearing to bring the same into accurate alinement with any other journal bearing in which the shaft 2 is journaled. This construction also permits vertical adjustment of the ends of the journal bearing to aline all of the journal bearings irrespective of any inclination in which the supporting hanger 3—4 may be mounted as a result of any unevenness of the lower surface of the bench or table. The outer end of each of the rods 12 is provided with an engageable portion 14 by which the said rod may be turned for purposes of adjustment. Nuts 15 are screwed onto the rods 12 and into locking engagement with the bracket 11 to hold the rods from turning as a result of the vibration of the machines when in operation. Provision is made for holding the journal bearing positively in proper position for supporting the shaft. As shown a pair of screws 16 are threaded through ears on the bracket 11 and have their lower ends engaging the upper member 7 of the journal bearing at opposite sides of the rods 12. The screws 16 will prevent oscillation of the journal bearing relative to the shaft 2 after proper adjustment has been effected. Nuts 17 on the screws 16 and engaging the ears of the bracket through which the screws are threaded lock the screws against becoming loosened as a result of the vibration of the parts when in operation.

The bracket 11 is formed with an interiorly threaded portion 18. Said bracket 11 is supported from the hanger bracket 3—4 by an adjustable connection 19 having right hand threads on one end thereof and left hand threads on the opposite ends thereof to correspond with the threads formed in the bracket 3—4 and with the threads formed in the portion 18 of the bracket 11. Thus the connection 19 may be simultaneously threaded into the bracket 3—4 and the portion 18 of the bracket 11 in order to raise the bracket 11 to any desired adjusted position. Similarly, the bracket 11 may be lowered from one adjustment to another by proper turning of the connection 19. Nuts 20 on the threaded portions of the connection 19 may be forced into locking engagement with the bracket 3—4 and with the bracket 11, respectively, in order to prevent dislocation of any of the parts as a result of vibration caused by operation of the machines.

As shown the bracket 11 constitutes a support for a pair of matching housing members 21. Each of the housing members is formed with a pair of arms 22 which are pivotally supported upon pivot lugs 23 on the bracket. This permits the housing members to be moved to open and closed positions and maintains them in proper relation to the other parts without special adjustment since the housing members accompany the bracket through all movements thereof when said bracket is being adjusted; or, the housing members may be easily removed and placed upon the bracket after the bracket has been adjusted.

The member 8 of the journal bearing is formed with a depending arm 24 which pivotally supports a lever 25. The lever 25 has a bifurcated extension 26 between the arms of which the bearing is received. As shown, the extension 26 is outside of the housing but operates to control a member (not shown) within the housing. The lever 25 is actuated by a spring 27 in a direction which holds the arms of the extension 26 away from the housing, and said lever may be operated in opposition to said spring.

From the foregoing it is apparent that there is a coöperative relationship between the parts described, permitting the journal bearing to be raised or lowered or adjusted laterally, or inclined as required to obtain the necessary exactness of adjustment and to prevent improper alinement of the journal bearing relative to the shaft. My invention, as above described, completely and satisfactorily attains the object and purpose of adjustably supporting the journal bearing in position to accommodate the shaft without the slightest torsional strains.

What I claim and desire to secure by Letters Patent, is:—

1. A device of the character described, comprising a support, clamping elements carried by said support, a hanger movable to different lateral adjustments on said clamping elements, a bracket, a member having right and left hand threaded connection with said hanger and with said bracket for adjusting said bracket in different adjusted positions relative to said hanger, a journal bearing pivotally supported by said bracket, and a shaft journaled in said bearing.

2. A device of the character described, comprising a support, clamping elements carried by said support, a hanger movable to different lateral adjustments on said clamping elements, a bracket, a member having right and left hand threaded connection with said hanger and with said bracket for adjusting said bracket in different adjusted positions relative to said hanger, a journal bearing pivotally supported by said bracket, and elements for holding said journal bearing rigidly in any desired adjustment.

3. A device of the character described, comprising a bracket, a journal bearing, pivot means pivotally supporting said journal bearing in said bracket, a shaft journaled in said bearing, and adjustable abutments supported by said bracket at opposite sides of said pivot means for preventing said journal bearing from turning the said pivot means.

BENJAMIN WEINBERGER.